US012622341B2

(12) United States Patent
Stanhope et al.

(10) Patent No.: US 12,622,341 B2
(45) Date of Patent: May 12, 2026

(54) AGRICULTURAL SYSTEM AND METHOD FOR DETERMINING A POSITION OF A GAUGE WHEEL OF A ROW UNIT FOR A SEED-PLANTING IMPLEMENT

(71) Applicant: CNH Industrial America LLC, New Holland, PA (US)

(72) Inventors: Trevor Stanhope, Oak Lawn, IL (US); Michael Christopher Conboy, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 981 days.

(21) Appl. No.: 17/724,972

(22) Filed: Apr. 20, 2022

(65) Prior Publication Data

US 2023/0337569 A1 Oct. 26, 2023

(51) Int. Cl.
*A01B 79/02* (2006.01)
*A01B 35/00* (2006.01)
*A01B 63/00* (2006.01)
*A01B 63/16* (2006.01)
*A01C 5/06* (2006.01)

(52) U.S. Cl.
CPC ............ *A01B 79/02* (2013.01); *A01B 63/008* (2013.01); *A01B 63/16* (2013.01); *A01C 5/064* (2013.01); *A01B 35/00* (2013.01)

(58) Field of Classification Search
CPC ....... A01B 79/02; A01B 63/008; A01B 63/16; A01B 35/00; A01B 35/16; A01C 5/06–068
See application file for complete search history.

(56) References Cited

U.S. PATENT DOCUMENTS

| | | | |
|---|---|---|---|
| 6,085,846 A | 7/2000 | Buchl et al. | |
| 6,216,794 B1 * | 4/2001 | Buchl | A01B 63/00 |
| | | | 172/4 |
| 7,946,232 B2 | 5/2011 | Patwardhan et al. | |

(Continued)

FOREIGN PATENT DOCUMENTS

| | | | | |
|---|---|---|---|---|
| WO | WO-2018075788 A1 * | 4/2018 | | A01C 5/06 |
| WO | WO 2021/021594 | 2/2021 | | |

OTHER PUBLICATIONS

No-Till Farmer, Dawn Unveils New Technology for Planters, Drills for Spring 2015, Seeding & Planting Equipment, Precision Ag, Dec. 4, 2014, 1 page. Retrieved From https://www.no-tillfarmer.com/articles/4063-dawn-unveils-new-technology-for-planters-drills-for-spring-2015.

*Primary Examiner* — Tara Mayo
(74) *Attorney, Agent, or Firm* — Dority & Manning, P.A.

(57) ABSTRACT

A row unit for a seed-planting implement includes a frame and a disk opener supported relative to the frame and configured to form a furrow within a field. The row unit further includes a gauge wheel arm supported relative to the frame, and a gauge wheel coupled to the gauge wheel arm. Additionally, the row unit includes a sensor assembly having a rotational sensor, a first sensor arm, and a second sensor arm. A proximal end of the first sensor arm is coupled to the rotational sensor, a proximal end of the second sensor arm is coupled to a distal end of the first sensor arm, and a distal end of the second sensor arm is coupled to the gauge wheel arm. The rotational sensor is configured to generate data indicative of a position of the gauge wheel arm based on movement of the first sensor arm.

19 Claims, 6 Drawing Sheets

(56)  References Cited

U.S. PATENT DOCUMENTS

| | | | |
|---|---|---|---|
| 8,275,525 B2 | 9/2012 | Kowalchuk et al. | |
| 9,826,677 B2 * | 11/2017 | Gervais et al. | A01C 7/205 |
| 9,968,030 B2 | 5/2018 | Kowalchuk et al. | |
| 10,219,421 B2 | 3/2019 | Achen et al. | |
| 10,412,881 B1 | 9/2019 | Houck | |
| 10,455,756 B2 | 10/2019 | Sauder et al. | |
| 10,462,956 B2 | 11/2019 | Hamilton | |
| 10,537,055 B2 | 1/2020 | Gresch et al. | |
| 10,701,853 B2 | 7/2020 | Swanson et al. | |
| 2013/0248212 A1 * | 9/2013 | Bassett | A01C 7/205 |
| | | | 172/4 |
| 2015/0289438 A1 * | 10/2015 | Sauder et al. | A01C 5/064 |
| | | | 172/430 |
| 2018/0092290 A1 * | 4/2018 | Hubner et al. | A01C 7/203 |
| 2019/0110388 A1 * | 4/2019 | Gresch et al. | A01C 7/20 |
| 2019/0124824 A1 * | 5/2019 | Hubner et al. | A01C 7/203 |
| 2019/0254223 A1 | 8/2019 | Eichhorn et al. | |
| 2020/0100423 A1 | 4/2020 | Dienst | |
| 2021/0289688 A1 | 9/2021 | Sivinski | |
| 2022/0117147 A1 * | 4/2022 | Collin | A01C 5/064 |

* cited by examiner

200

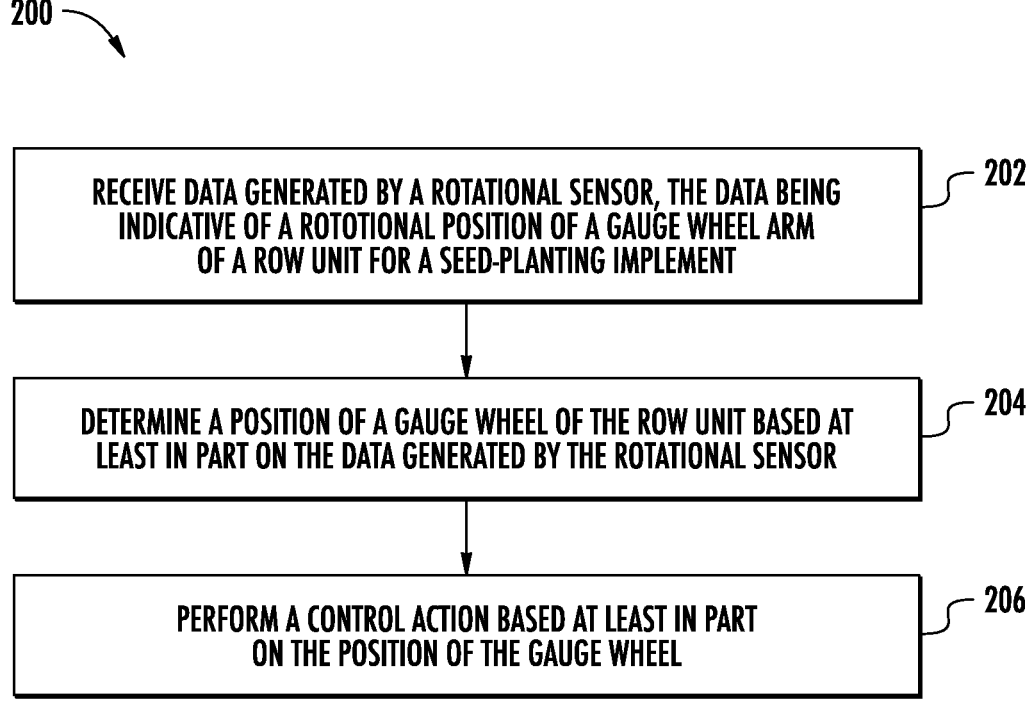

RECEIVE DATA GENERATED BY A ROTATIONAL SENSOR, THE DATA BEING
INDICATIVE OF A ROTOTIONAL POSITION OF A GAUGE WHEEL ARM
OF A ROW UNIT FOR A SEED-PLANTING IMPLEMENT — 202

DETERMINE A POSITION OF A GAUGE WHEEL OF THE ROW UNIT BASED AT
LEAST IN PART ON THE DATA GENERATED BY THE ROTATIONAL SENSOR — 204

PERFORM A CONTROL ACTION BASED AT LEAST IN PART
ON THE POSITION OF THE GAUGE WHEEL — 206

FIG. 8

AGRICULTURAL SYSTEM AND METHOD FOR DETERMINING A POSITION OF A GAUGE WHEEL OF A ROW UNIT FOR A SEED-PLANTING IMPLEMENT

FIELD OF THE INVENTION

The present disclosure relates generally to planting operations performed using a planting implement, such as a planter or a seeder, and, more particularly, to systems and methods for determining a position of a gauge wheel of a row unit of the planting implement.

BACKGROUND OF THE INVENTION

Planting implements, such as planters, are generally known for performing planting operations within a field. A typical planter includes a plurality of row units, with each row unit including various ground engaging tools for creating a furrow within the soil, placing a seed within the furrow, and closing the soil around the seed. Typically, the depth of the furrow is set by manually adjusting the position of a gauge wheel configured to roll along the surface of the field. However, such manual adjustment requires an operator to check the position of the gauge wheel of each row unit before operation. With an increasing number of row units, checking the position of the gauge wheels is becoming increasingly time consuming and it may be easy to overlook a row unit. Further, if the gauge wheel position suddenly changes during operation, an operator might not know until the next inspection, which might lead to losses in yield due to the depth of the furrow being different than desired.

Accordingly, an improved agricultural system and method for determining a position of a gauge wheel of a row unit of the planting implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a row unit for a seed-planting implement. The row unit may include a frame and a disk opener supported relative to the frame, with the disk opener being configured to form a furrow within a field across which the seed-planting implement is traveling. The row unit may further include a gauge wheel arm supported relative to the frame, and a gauge wheel coupled to the gauge wheel arm, with the gauge wheel configured to roll along a surface of the field. Additionally, the row unit may include a gauge sensor assembly having a rotational sensor supported relative to the frame, a first sensor arm, and a second sensor arm. The first sensor arm extends between a first proximal end and a first distal end, with the first proximal end of the first sensor arm being coupled to the rotational sensor. The second sensor arm extends between a second proximal end and a second distal end, with the second proximal end of the second sensor arm being coupled to the first distal end of the first sensor arm, and with the second distal end of the second sensor arm being coupled to the gauge wheel arm. The rotational sensor is configured to generate data indicative of a rotational position of the gauge wheel arm based at least in part on movement of the first sensor arm relative to the rotational sensor.

In another aspect, the present subject matter is directed to a seed-planting implement having a toolbar, and a plurality of row units coupled to the toolbar. Each row unit may include a frame and a disk opener supported relative to the frame, the disk opener being configured to form a furrow within a field across which the seed-planting implement is traveling. Each row unit may further include a gauge wheel arm supported relative to the frame and a gauge wheel coupled to the gauge wheel arm, the gauge wheel being configured to roll along a surface of the field. Additionally, each row unit may include a gauge sensor assembly having a rotational sensor supported relative to the frame, a first sensor arm, and a second sensor arm. The first sensor arm extends between a first proximal end and a first distal end, with the first proximal end of the first sensor arm being coupled to the rotational sensor. The second sensor arm extends between a second proximal end and a second distal end, with the second proximal end of the second sensor arm being coupled to the first distal end of the first sensor arm, and with the second distal end of the second sensor arm being coupled to the gauge wheel arm. The rotational sensor is configured to generate data indicative of a rotational position of the gauge wheel arm based at least in part on movement of the first sensor arm relative to the rotational sensor.

In an additional aspect, the present subject matter is directed to a method for determining a position of a gauge wheel of a row unit for a seed-planting implement, where the row unit includes a frame, a disk opener supported relative to the frame, with the disk opener being configured to form a furrow within a field across which the seed-planting implement is traveling, and a gauge wheel arm supported relative to the frame, with the gauge wheel being coupled to the gauge wheel arm and being configured to roll along a surface of the field. The method may include receiving, with a computing system, data indicative of a rotational position of the gauge wheel arm, where the data is generated by a rotational sensor supported relative to the frame and coupled to the gauge wheel arm via a linkage assembly. The linkage assembly may include a first sensor arm and a second sensor arm. The first sensor arm extends between a first proximal end and a first distal end, with the first proximal end of the first sensor arm being coupled to the rotational sensor. The second sensor arm extends between a second proximal end and a second distal end, with the second proximal end of the second sensor arm being coupled to the first distal end of the first sensor arm, and the second distal end of the second sensor arm being coupled to the gauge wheel arm. The method may further include determining, with the computing system, the position of the gauge wheel based at least in part on the data generated by the rotational sensor. Additionally, the method may include performing, with the computing system, a control action based at least in part on the position of the gauge wheel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 illustrates a flow diagram of one embodiment of a method for determining a position of a gauge wheel of a row unit for a planting implement in accordance with aspects of the present subject matter.

Figure 1:
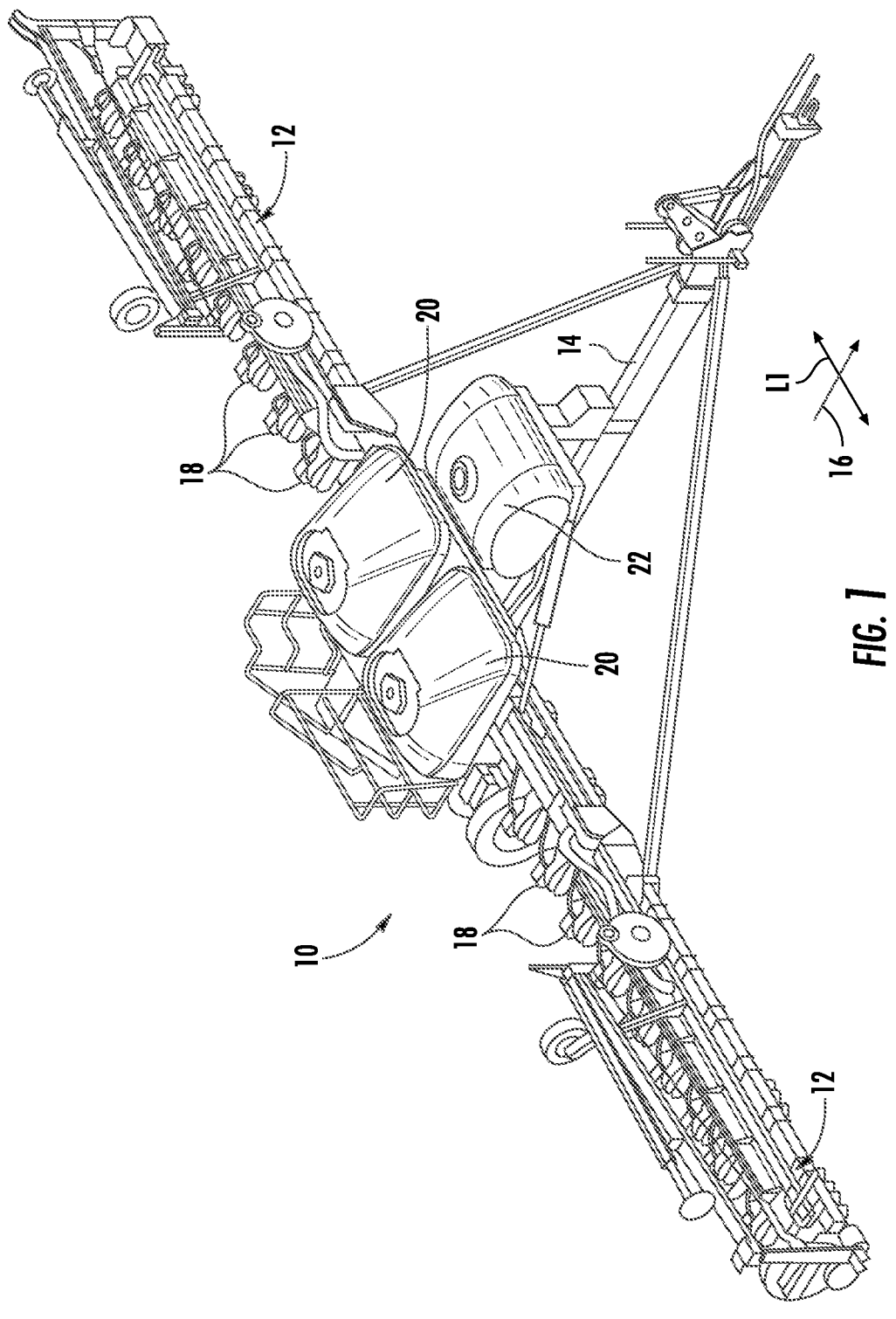
FIG. 1 illustrates a perspective view of one embodiment of a planting implement in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining a position of a gauge wheel of a row unit for a planting implement. Specifically, in several embodiments, a planting implement may include a plurality of row units, with each row unit including various ground engaging tools for creating a furrow within the soil, placing a seed within the furrow, and closing the furrow around the seed. For instance, the row units may include a disk opener configured to form the furrow, and a gauge wheel that rolls along a surface of the field, where the position of the gauge wheel is adjustable to set the penetration depth of the disk opener, and thus, the depth of the furrow. In accordance with aspects of the present subject matter, each of the row units further includes a gauge sensor assembly including a position sensor and a linkage assembly coupling the position sensor to a gauge wheel arm that supports the gauge wheel relative to a frame of the row unit. For instance, the linkage assembly includes at least a first sensor arm and a second sensor arm, with the first arm being coupled between the position sensor and the second sensor arm, and with the second sensor arm being coupled between the first sensor arm and the gauge wheel arm. As the gauge wheel arm is moved to adjust the position of the gauge wheel, the second sensor arm of the linkage assembly moves the first sensor arm, which, in turn, moves the position sensor. The position sensor generates data indicative of the position of the gauge wheel based on movement of the position sensor (e.g., rotation of a rotational input shaft of a rotational sensor).

In some embodiments, a computing system may be configured to determine the position of the gauge wheel (and, optionally, the associated position of the disk opener(s) and/or depth of the furrow(s)) based at least in part on the data generated by the position sensor(s). In one embodiment, the computing system may further be configured to perform a control action based on the position(s) of the gauge wheel(s) of the row unit(s), such as notify an operator of the position of the gauge wheel(s) and/or control a gauge wheel actuator(s) to adjust the position(s) of the gauge wheel(s).

Thus, the gauge sensor assemblies allow the positions of the gauge wheels to be determined in some embodiments without an operator having to manually check the row units, which saves time. Moreover, the gauge sensor assemblies allow the positions of the gauge wheels to be checked during a planting operation in some embodiments, which ensures proper furrow depth, and thus, helps ensure proper seed conditions. Additionally, in some embodiments, the positions of the gauge wheels may be adjusted automatically based on the positions of the gauge wheels determined using the gauge sensor assemblies.

Referring now to drawings, FIG. 1 illustrates a perspective view of one embodiment of a planting implement (e.g., a planter 10) in accordance with aspects of the present subject matter. As shown in FIG. 1, the planter 10 may include a toolbar or frame assembly 12 extending along a lateral direction L1 and connected at its middle to a forwardly extending tow bar 14 to allow the planter 10 to be towed by a work vehicle (not shown), such as an agricultural tractor, in a forward direction of travel (e.g., as indicated by arrow 16). The frame assembly 12 may generally be configured to support a plurality of seed planting units (or row units) 18. As is generally understood, each row unit 18 may be configured to deposit seeds at a desired depth beneath the soil surface and at a desired seed spacing as the planter 10 is being towed by the work vehicle, thereby establishing rows of planted seeds. In some embodiments, the bulk of the seeds to be planted may be stored in one or more hoppers or seed tanks 20. Thus, as the row units 18 plant the seeds, a pneumatic distribution system may distribute additional seeds from the seed tanks 20 to the individual row units 18 via one or more delivery lines. Additionally, one or more fluid tanks 22 may store agricultural fluids, such as insecticides, herbicides, fungicides, fertilizers, and/or the like.

It should be appreciated that, for purposes of illustration, only a portion of the row units 18 of the planter 10 have been shown in FIG. 1. In general, the planter 10 may include any number of row units 18, such as 6, 8, 12, 16, 24, 32, or 36 row units. In addition, it should be appreciated that the lateral spacing between row units 18 along the lateral direction L1 may be selected based on the type of crop being planted. For example, the row units 18 may be spaced approximately 30 inches from one another for planting corn, and approximately 15 inches from one another for planting soybeans.

It should also be appreciated that the configuration of the planter 10 described above and shown in FIG. 1 is provided only to place the present subject matter in an exemplary field of use. Thus, it should be appreciated that the present subject matter may be readily adaptable to any manner of planter configuration or any other planting implement configuration, including seeders.

Figure 2:
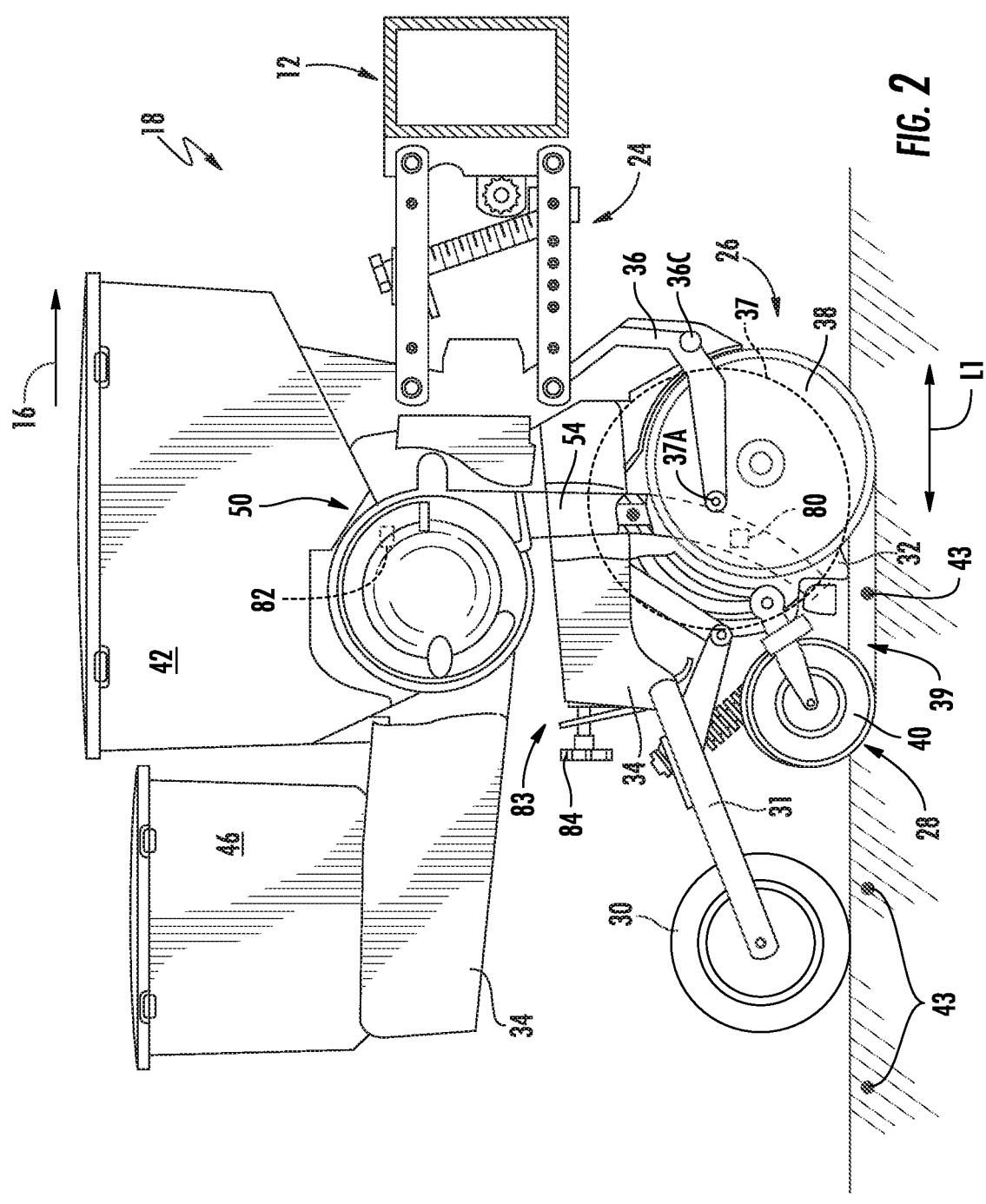
FIG. 2 illustrates a side view of one embodiment of a row unit suitable for use with a planting implement in accordance with aspects of the present subject matter.

Referring now to FIG. 2, a side view of one embodiment of a row unit 18 is illustrated in accordance with aspects of the present subject matter. As shown, the row unit 18 includes a linkage assembly 24 configured to mount the row unit 18 to the toolbar or frame assembly 12 of the planter 10. As shown in FIG. 2, the row unit 18 also includes a furrow opening assembly 26, a furrow closing assembly 28, and a press wheel 30. In general, the furrow opening assembly 26 may include a pair of gauge wheels 37 (only one of which is shown in dashed lines) operatively connected to a frame 34 of the row unit 18 via a respective gauge wheel arm 36 (only one of which is shown), with the gauge wheel arms 36 being coupled to the frame 34 such that they are rotatable relative to the frame 34 about a respective rotational joint 36C (only one of which is shown). It should be appreciated that the gauge wheel arms 36 and gauge wheels 37 are substantially identical. Additionally, the opening assembly 26 may also include one or more opening disks 38 of a disk opener configured to excavate a trench or furrow 39 in the soil, and a firming point 32. As is generally understood, the gauge wheels 37 may be configured to rotate about their pivot axes 37A as they engage or roll along the surface of the field, with the position of the gauge wheels 37 being adjustable with respect to the frame 34, and relative to the opening disk(s) 38, to adjust the height of the opening disk(s) 38 and set the desired depth of the furrow 39 being excavated. Moreover, as shown, the furrow closing assembly 28 may include one or more closing disks 40 configured to close the furrow 39 after seeds 43 have been deposited therein. The press wheel 30 may then be configured to roll over the closed furrow 39 to firm the soil over the seeds 43 and promote favorable seed-to-soil contact.

Additionally, as shown in FIG. 2, the row unit 18 may include one or more seed hoppers 42 and, optionally, a fluid tank 46 supported on the frame 34. In general, the seed hopper(s) 42 may be configured to store seeds received from the seed tanks 20, which are to be deposited within the furrow 39 as the row unit 18 moves over and across the field. In some embodiments, each seed hopper 42 may store a different seed type. Alternatively, a single seed hopper 42 may be used to store more than one type of seed. For example, a single seed hopper 42 may be internally divided (e.g., via a divider wall(s)) so as to define separate seed chambers or compartments for storing differing seed types. Furthermore, the fluid tank 46 may be configured to store fluid received from the fluid tank 22 (FIG. 1), which is to be sprayed onto the seeds dispensed from the seed hoppers 42.

Moreover, in one embodiment, the row unit 18 may include a seed meter 50 provided in operative association with the seed hopper(s) 42. In general, the seed meter 50 may be configured to release seeds 43 received from the seed hopper(s) 42 for deposit within the furrow 39. For instance, the seed meter 50 may be coupled to a suitable vacuum source (not shown) (e.g., a blower powered by a motor and associated tubing or hoses) configured to generate a vacuum or negative pressure that attaches the seeds to a rotating seed disk (not shown) of the seed meter 50 which controls the rate at which the seeds are output from the seed meter 50 to a seed tube 54. The seed tube may extend vertically between the seed meter 50 and the ground to facilitate delivery of the seeds output from the seed meter 50 to the furrow 39. The seed meter 50 and the vacuum source may be configured to consistently meter out the seeds 43 (e.g., according to a desired population density) during a planting operation.

Moreover, in several embodiments, the row unit 18 may also include one or more sensors 80, 82 for generating data indicative of the timing and/or frequency of seeds being deposited into the furrow 39 between the opening and closing assemblies 26, 28. For instance, as shown in the illustrated embodiment, the row unit 18 may include one or more seed tube sensors 80 configured to detect seeds as they fall or otherwise travel through the seed tube 54. In such an embodiment, the seed tube sensor(s) 80 may generally correspond to any suitable sensor or sensing device configured to detect seeds passing through the seed tube 54 (e.g., whether falling through the tube 54 via gravity or by being conveyed through the seed tube 54 via a driven belt or other seed-transport means extending within the seed tube 54). For example, the seed tube sensor(s) 80 may correspond to an optical sensor (e.g., a break-beam sensor or a reflectance sensor), a microwave sensor, a Hall-effect sensor, and/or the like.

In addition to the seed tube sensor(s) 80 (or as an alternative thereto), the row unit 18 may include other sensors for generating data indicative of the timing and frequency of seeds being deposited into the furrow 39. For instance, as shown in the illustrated embodiment, the row unit 18 may include one or more seed meter sensors 82 configured to detect seeds that are being or will be discharged from the seed meter 50. Specifically, in one embodiment, the seed meter sensor(s) 82 may correspond to a post-singulation sensor positioned within the seed meter 50 such that the sensor's detection zone is aligned with a location within a post-singulation region of the seed meter 50: (1) across which the seed disc or other seed transport member is rotated following the singulator (not shown) of the seed meter 50; and/or (2) through which each seed to be discharged from seed meter 50 passes following release of the seed from the seed disc. In such an embodiment, the seed meter sensor(s) 82 may generally correspond to any suitable sensor or sensing device configured to detect seeds that are being or will be discharged from the seed meter 50. For example, the seed meter sensor(s) 82 may correspond to an optical sensor (e.g., a break-beam sensor or a reflectance sensor), a microwave sensor, a Hall-effect sensor, and/or the like.

Additionally, the row unit 18 may include a gauge wheel adjustment assembly 83 for adjusting the position of the gauge wheels 37 and, thus, the penetration depth of the opening disk(s) 38 and the depth of the furrow 39. In one embodiment, the gauge wheel adjustment assembly 83 includes a handle 84 that is selectively positionable at different positions along a toothed slot 86 (FIG. 3) in the frame 34, with each of the positions being associated with a different position of the gauge wheel 37 relative to the frame 34. For instance, as particularly shown in FIGS. 3-6, each of the gauge wheel arms 36 has an upper portion 36A and a lower portion 36B disposed at an angle relative to each other about the rotational joint 36C. The upper portions 36A of the gauge wheel arms 36 rest against a respective depth stop 88S at a forward end of a rocker bar 88 when the gauge wheels 37 are in contact with a ground surface. As the handle 84 is moved along the slot, the rocker bar 88 is slid essentially parallel to the direction of travel 16, in the fore-aft direction. More particularly, when the rocker bar 88 is slid forward along the direction of travel 16, the depth stops 88S are also moved forward along the direction of travel 16, such as from the solid-lined positions to the dashed-lined positions shown in FIGS. 4 and 6. As the depth stops 88S move forward, the gauge wheel arms 36 are allowed to rotate about the rotational joints 36C to move the gauge wheels 37 relative to the frame 34, such as from the solid-lined positions to the dashed-lined positions shown in FIGS. 4 and 6. Such movement of the gauge wheels 37 moves the rotational joints 36C from a first height H1 above the ground surface GS1 to a second height H2 above the ground surface GS1, generally closer to the ground surface GS1, such that the furrow created by the opening disk(s) 38 becomes deeper. Conversely, when the rocker bar 88 is slid rearward (i.e., opposite the direction of travel 16), the depth stops 88S are also moved rearward relative to the forward direction of travel 16 (e.g., from the dashed-lined positions to the solid-lined positions shown in FIGS. 4 and 6), which allows the gauge wheel arms 36 to rotate about the rotational joints 36C in the opposite direction to move the gauge wheels 37 relative to the frame 34 (e.g., from the dashed-lined positions to the solid-lined positions shown in FIGS. 4 and 6) such that the rotational joints 36C are moved further from the ground surface and the furrow created by the opening disk(s) 38 becomes shallower.

It should be appreciated that, in addition to, or alternatively to, the handle 84 that is manually slidable relative to the toothed slot 86, a gauge wheel actuator 134 (FIG. 7) may be provided that is controllable to move the rocker bar 88 relative to the frame 34 and/or one or both of the gauge wheel arms 36 relative to the frame 34.

It should be appreciated that the configuration of the row unit 18 described above and shown in FIGS. 2-6 is provided only to place the present subject matter in an exemplary field of use. Thus, it should be appreciated that the present subject matter may be readily adaptable to any manner of row unit configuration.

Figures 3, 4:
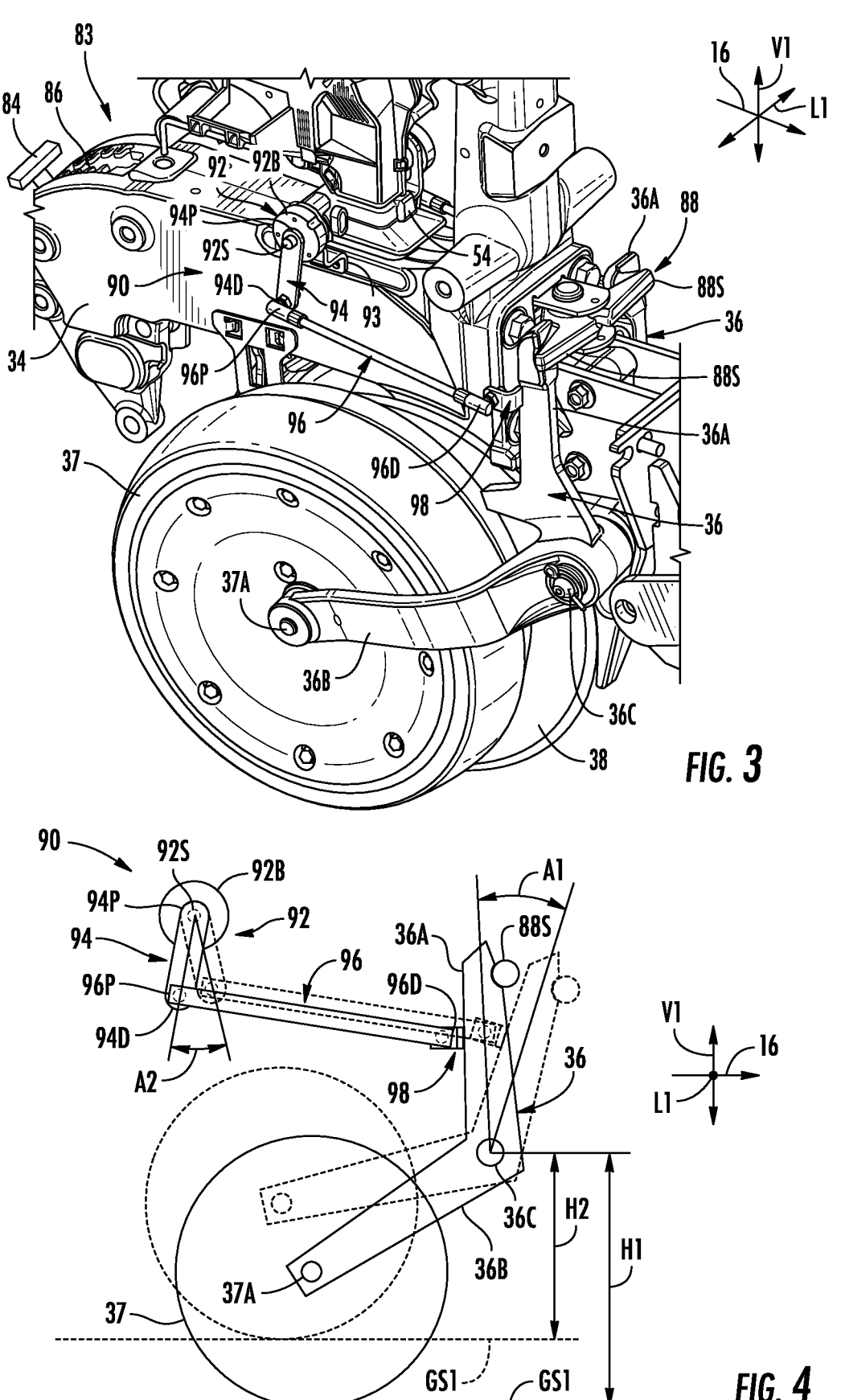
FIGS. 3 and 4 illustrate a first embodiment of a gauge sensor assembly suitable for use with a row unit of a planting implement in accordance with aspects of the present subject matter.
Figures 5, 6:
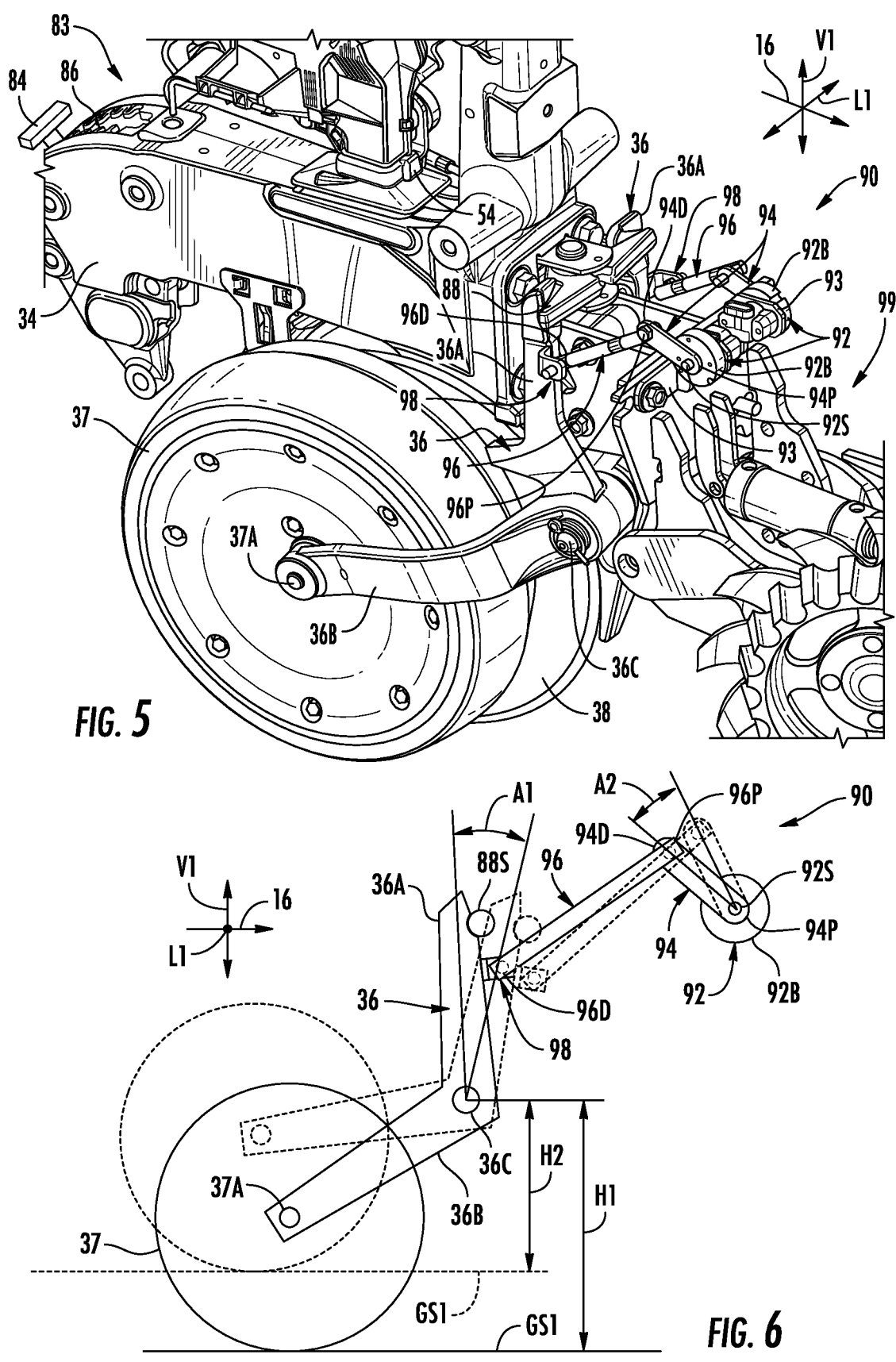
FIGS. 5 and 6 illustrate another embodiment of a gauge sensor assembly suitable for use with a row unit of a planting implement in accordance with aspects of the present subject matter.

In accordance with aspects of the present subject matter, as particularly shown in FIGS. 3-6, a gauge sensor assembly 90 may be provided in operative association with one or both of the gauge wheels 37 of one or more of the row units 18. More particularly, each gauge sensor assembly 90 may generate data that is indicative of the position of an associated gauge wheel arm 36 (and, thus, the position of the respective gauge wheel 37 relative to the frame), the position of the associated opening disk(s) 38 relative to the ground and/or the depth of the furrow generated by the associated opening disk(s) 38. FIGS. 3 and 4 illustrate various views of one embodiment of the gauge sensor assembly 90 suitable for use with the row unit 18 shown in FIG. 2 in accordance with aspects of the present subject matter. Specifically, FIG. 3 illustrates a partial, perspective view of the row unit 18 having the gauge sensor assembly 90 installed relative thereto and FIG. 4 illustrates a partial, schematic side view of components of the row unit 18 and the gauge sensor assembly 90 according to a first embodiment. Additionally, FIGS. 5 and 6 illustrate various views of another embodiment of the gauge sensor assembly 90 suitable for use with the row unit 18 shown in FIG. 2 in accordance with aspects of the present subject matter. Specifically, FIG. 5 illustrates a partial, perspective view of the row unit 18 having the gauge sensor assembly 90 installed relative thereto and FIG. 6 illustrates a partial, schematic side view of components of the row unit 18 and the gauge sensor assembly 90 according to the second embodiment.

As shown in FIGS. 3-6, the gauge sensor assembly 90 includes at least one position sensor 92 configured to generate data indicative of the position of an associated one of the gauge wheel arms 36 and thus, of the respective gauge wheel 37, relative to the frame 34. Each position sensor 92 is coupled to the respective gauge wheel arm 36 by a respective linkage assembly. The linkage assembly includes at least a first sensor arm or link 94 and a second sensor arm or link 96. The first sensor arm 94 extends along a first, fixed length between a proximal end 94P and a distal end 94D. Similarly, the second sensor arm 96 extends along a second, fixed length between a proximal end 96P and a distal end 96D.

The proximal end 94P of the first sensor arm 94 is coupled to the position sensor 92. For instance, in one embodiment, the position sensor 92 is configured as a rotational sensor having a rotational shaft 92S defining an axis about which the rotational shaft 92S is configured to rotate relative to a sensor body 92B, where the position sensor 92 generates data indicative of the rotational position of the rotational shaft 92S relative to the sensor body 92B. In some embodiments, the position sensor 92 (e.g., the sensor body 92B) is coupled to the frame 34 by a mounting bracket 93. However, in other embodiments, the position sensor 92 may be coupled relative to the frame 34 in any other suitable way. In one embodiment, the proximal end 94P of the first sensor arm 94 is coupled to the rotational shaft 92S of the position sensor 92. Particularly, the proximal end 94P of the first sensor arm 94 is rotationally fixed to the rotational shaft 92S of the position sensor 92 such that rotation of the first sensor arm 94 causes a same rotation of the rotational shaft 92S of the position sensor 92. It should be appreciated that the position sensor(s) 92 may be configured as any other suitable sensor.

Further, the distal end 94D of the first sensor arm 94 is coupled to the proximal end 96P of the second sensor arm 96. More particularly, in one embodiment, the distal end 94D of the first sensor arm 94 is coupled to the proximal end 96P of the second sensor arm 96 such that the first and second sensor arms 96 may rotate relative to each other. Moreover, the distal end 96D of the second sensor arm 96 is coupled to the gauge wheel arm 36. For instance, in one embodiment, the distal end 96D of the second sensor arm 96 is coupled to the upper portion 36A of the gauge wheel arm 36. However, in other embodiments, the distal end 96D of the second sensor arm 96 may be coupled to the lower portion 36B of the gauge wheel arm 36. In one embodiment, distal end 96D of the second sensor arm 96 is coupled to the gauge wheel arm 36 such that the second sensor arm 96 is rotatable relative to the gauge wheel arm 36. In some embodiments, the distal end 96D of the second sensor arm 96 is directly coupled to the gauge wheel arm 36. However, in other embodiments, such as in the embodiments shown in FIGS. 3-6, the gauge sensor assembly 90 further includes a bent tab 98 coupled between the second sensor arm 96 and the gauge wheel arm 36 to help bridge any gap (e.g., in the lateral direction L1, perpendicular to the direction of travel 16) that may exist between the second sensor arm 96 and the gauge wheel arm 36. For instance, the bent tab 98 may include a first tab end coupled to the distal end 96D of the second sensor arm 96 and a second tab end coupled to the upper portion 36A of the gauge wheel arm 36, where the first and second tab ends are at an angle relative to each other.

In some embodiments, such as the embodiment shown in FIGS. 3 and 4, the position sensor 92 is mounted to the frame 34 at a position rearward of the depth stop(s) 88S and the upper portion 36A of the gauge wheel arm 36 relative to the direction of travel 16. For instance, in some embodiments, the position sensor 92 may be mounted to the frame 34 rearward of the distal end 96D of the second sensor arm 96 relative to the forward direction of travel 16, such as above the gauge wheel 37 along a vertical direction V1 (FIG. 4). For example, the position sensor 92 may be mounted to the frame 34 at a position along the lateral direction L1 adjacent to where the seed tube 54 connects to the frame 34.

The embodiment shown in FIGS. 5 and 6 only differs from the embodiment shown in FIGS. 3 and 4 in that the position sensor 92 is mounted to the frame 34 at a position forward of the depth stop(s) 88S and the upper portion 36A of the gauge wheel arm 36 relative to the direction of travel 16. For instance, in some embodiments, the position sensor 92 may be mounted to the frame 34 at a location forward of the distal end 96D of the second sensor arm 96 relative to the forward direction of travel 16. For example, a row cleaner assembly 99 may be supported on the frame 34 at a location forward of the opening disk(s) 38 relative to the forward direction of travel 16, where the row cleaner assembly 99 is configured to reduce residue on the surface of the field in front of the furrow 39 (FIG. 2), and the position sensor 92 may be supported on the frame 34 where the row cleaner assembly 99 is supported on the frame 34. More particularly, in one embodiment, the row cleaner assembly 99 and the position sensor 92 (e.g., the mounting bracket 93 for the position sensor 92) are coupled to the frame 34 by the same bolt(s), screw(s), rivet(s), and/or the like. However, in other embodiments, the position sensor 92 and the row cleaner assembly 99 may instead be separately coupled to the frame 34.

As described above, as the rocker bar 88 (FIGS. 3 and 5) is slid forward relative to the direction of travel 16, the depth stops 88S are also slid forward relative to the direction of travel 16, which allows the gauge wheel arms 36 to pivot clockwise about the rotational joints 36C, such as by a first angle A1 from the solid-lined position to the dashed-lined position shown in FIGS. 4 and 6. Such pivoting of the gauge wheel arms 36 further causes the second sensor arm(s) 96, and the optional tab(s) 98, to be moved forward relative to the direction of travel 16, from the solid-lined positions to the dashed-lined positions shown in FIGS. 4 and 6. As the second sensor arm(s) 96 moves forward, the proximal end(s) 96P of the second sensor arm(s) 96 pulls or pushes the distal end(s) 94D of the first sensor arm(s) 94 forward relative to the direction of travel 16, from the solid-lined positions to the dashed-lined positions shown in FIGS. 4 and 6. Due to the connection between the position sensor(s) 92 (e.g., the rotational shaft(s) 92S) and the proximal end(s) 94P of the first sensor arm(s) 94, the first sensor arm(s) 94 rotates through a second angle A2 (e.g., with the rotational shaft(s) 92S) as the second sensor arm(s) 96 pulls or pushes the distal end(s) 94D of the first sensor arm(s) 94 forward relative to the direction of travel 16, from the solid-lined positions to the dashed-lined positions shown in FIGS. 4 and 6. It should be appreciated that the movements of the gauge sensor assembly 90 are reversed when the rocker bar 88 is slid rearward relative to the forward direction of travel 16.

Accordingly, each of the position sensors 92 may generate data indicative of the rotational position of the rotational shaft 92S, where the first sensor arm 94 moves the rotational shaft 92S according to movement of the gauge wheel arm 36. As such, the data generated by the position sensor(s) 92 may be correlated to the rotational position of the respective gauge wheel arm 36 about the associated rotational joint 36C, the position of the associated gauge wheel 37 relative to the frame 34, the position of the associated opening disk(s) 38 relative to the ground (e.g., the penetration depth of the opening disk(s) 38), and/or the depth of the associated furrow 39. Thus, as will be described in greater detail below with reference to FIG. 7, the position of the gauge wheel(s) 37 may be automatically determined using the gauge sensor assembly 90.

Figure 7:
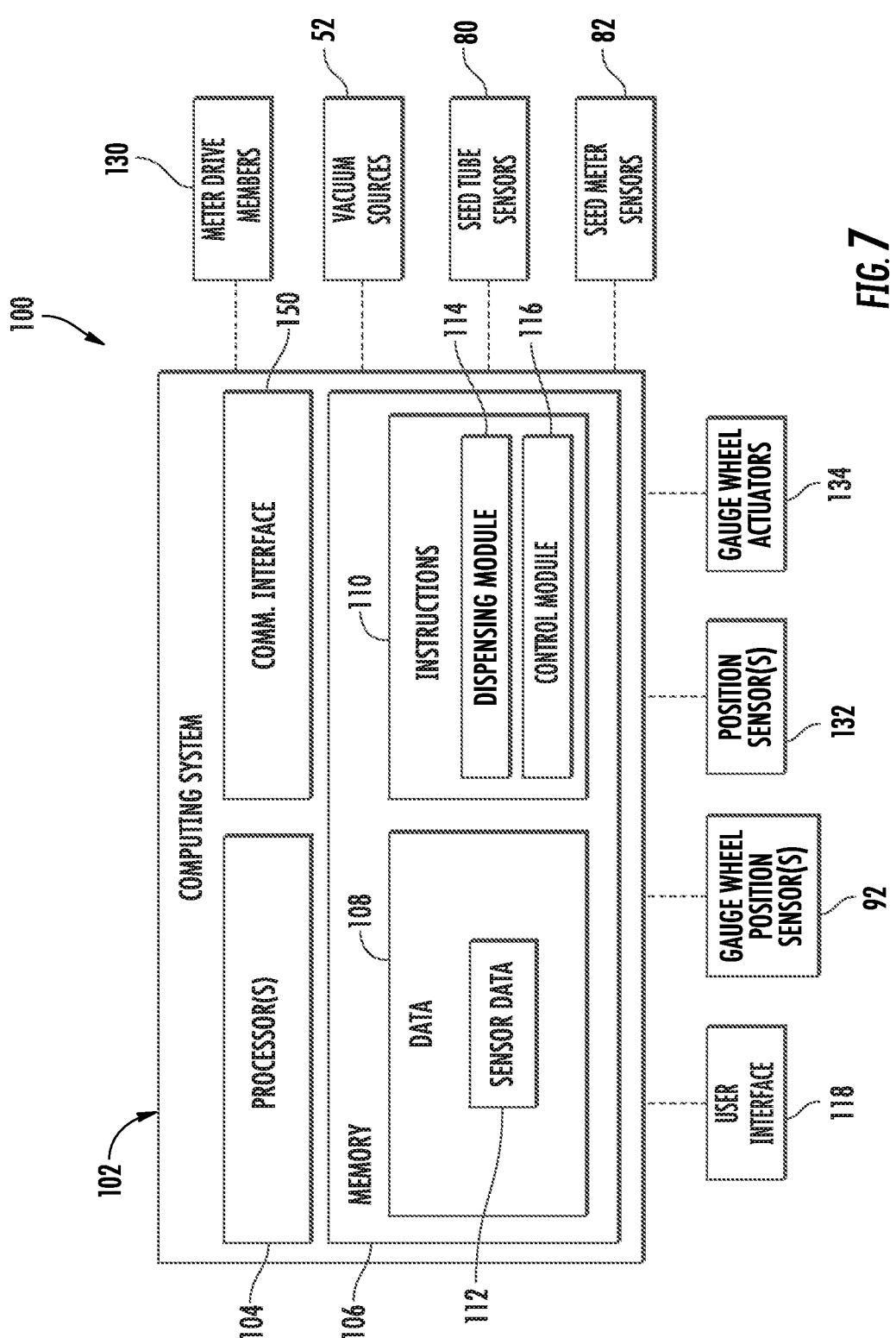
FIG. 7 illustrates a schematic view of a system for determining a position of a gauge wheel of a row unit for a planting implement in accordance with aspects of the present subject matter.

Referring now to FIG. 7, a schematic view of one embodiment of a system for determining a position of a gauge wheel of a row unit for a planting implement 10 is illustrated in accordance with aspects of the present subject matter. In general, the system 100 will be described herein with reference to the planting implement 10, the row unit 18, the gauge sensor assembly 90, and related components described above with reference to FIGS. 1-6. However, it should be appreciated that the disclosed system 100 may generally be utilized with any planter or seeder having any suitable implement configuration and/or with row units having any suitable row unit configuration.

In several embodiments, the system 100 may include a computing system 102 and various other components configured to be communicatively coupled to and/or controlled by the computing system 102, such as meter drive members 130 configured to rotationally drive the seed meters 50, the vacuum sources 52, gauge wheel actuators 134 configured to actuate the gauge wheels 37 of the row unit 18 to adjust the current planting depth, and/or various sensors configured to monitor one or more operating parameters associated with each row unit 18. For example, the computing system 102 may be communicatively coupled to the gauge wheel position sensor(s) 92 (e.g., at least one sensor 92 per row unit) configured to generate data indicative of the position of the gauge wheel(s) 37 relative to the frame 34, and thus, the position of the disc opener(s) 38 and/or the depth of the furrow 39. Further, the computing system 102 may be communicatively coupled to one or more additional sensors configured to generate data indicative of the frequency of the seeds being deposited within the furrow by each row unit, such as the seed tube sensor(s) 80 and/or the seed meter sensor(s) 82 provided in association with each row unit 18. Additionally, the computing system 102 may be communicatively coupled to one or more position sensor(s) 132 to determine the location of the planting implement 10, such as a satellite navigation positioning device (e.g., a GPS system, a Galileo positioning system, a Global Navigation satellite system (GLONASS), a BeiDou Satellite Navigation and Positioning system, a dead reckoning device, and/or the like).

It should be appreciated that the computing system 102 may correspond to any suitable processor-based device(s), such as a computing device or any combination of computing devices. Thus, as shown in FIG. 4, the computing system 102 may generally include one or more processor(s) 104 and associated memory devices 106 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store information accessible to the processor(s) 104, including data 108 that can be retrieved, manipulated, created and/or stored by the processor(s) 104 and instructions 110 that can be executed by the processor(s) 104.

In several embodiments, the data 108 may be stored in one or more databases. For example, the memory 106 may include a sensor database 112 for storing sensor data and/or other relevant data that may be used by the computing system 102 in accordance with aspects of the present subject matter. For instance, during operation of the planting implement, data from all or a portion of the sensors 80, 82, 92, 132 communicatively coupled to the computing system 102 may be stored (e.g., temporarily) within the sensor database 112 and subsequently used to determine one or more parameter values associated with the operation of the planting implement.

Moreover, in several embodiments, the instructions 110 stored within the memory 106 of the computing system 102 may be executed by the processor(s) 104 to implement a dispensing module 114. In general, the dispensing module 114 may be configured to control the operation of the meter drive member(s) 130 and the vacuum source(s) 52 to control the dispensing of the seeds 43 into the furrow(s) 39. For instance, the computing system 102 may control the operation of the seed meter(s) 50 and the vacuum source(s) 52 to drop seeds 43 within a furrow 39 according to a desired population density, seed spacing, distance interval and/or the like, such as according to a prescription map associated with the field. The dispensing module 114 may further be configured to control the position of the gauge wheel actuator(s) 134 to set the furrow depth for the planting operation, such as according to the prescription map and/or field conditions (e.g., moisture content, soil type, soil texture, soil temperature, and/or the like).

Referring still to FIG. 7, in several embodiments the instructions 110 stored within the memory 106 of the computing system 102 may also be executed by the processor(s) 104 to implement a control module 116. In general, the control module 116 may be configured to determine the position of the gauge wheel(s) 37 of the row unit(s) 18 based at least in part on the data generated by the gauge wheel position sensor(s) 92. For instance, the dispensing module 114 may be configured to determine the position of the gauge wheel(s) 37 of the row unit(s) 18 based at least in part on one or more suitable relationships and/or algorithms stored within the memory 106 that correlate the data generated by the position sensor(s) 92 to the position of the gauge wheel(s) 37, the position of the opening disk(s) 38, and/or the depth of the furrow(s) 39.

The control module 116 may further be configured to initiate a control action based on the position of the monitored gauge wheel(s) 37 determined using the data generated by the gauge wheel position sensor(s) 92. For instance, in one embodiment, the control module 116 may cause a visual or audible notification or indicator to be presented to the operator via an associated user interface 118 provided within the cab of the vehicle used to tow the planting implement 10. For example, in some embodiments, the control module 116 may be configured to simply provide an indication of the position of the gauge wheel(s) 37 based on the data generated by the gauge wheel position sensor(s) 92. In another embodiment, the control module 116 may be configured to compare the actual position of the gauge wheel(s) 37 determined from the data from the position sensor(s) 92 to a desired or pre-set position or range of positions of the gauge wheel(s) 37 and/or an associated penetration depth of the opening disk(s) 38 to a desired or pre-set penetration depth or penetration depth range (e.g., where the pre-set value or range is determined based on the prescription map, a user-input value, and/or the like). The control module 116 may then be configured to perform a control action based on the comparison, such as when the actual position of the gauge wheel(s) 37 and/or penetration depth of the opening disk(s) 38 differs from the desired position (e.g., by a given percentage) or is outside of the desired range. In such embodiment, the control action may include controlling the associated user interface 118 to provide to the operator a visual or audible notification or indicator indicative of when the current position of the gauge wheel(s) 37 is not within the desired gauge wheel position range. Alternatively, or additionally, the control module 116 may be configured to execute an automated control action designed to adjust the operation of the row unit 18 or the planting implement 10 based at least in part on the determined position of the gauge wheel(s) 37. For instance, in one embodiment, the computing system 102 may be configured to automatically adjust the depth of the furrow being cut into the soil (e.g., by adjusting the relative position of the gauge wheel and opening assembly 26 via control of the gauge wheel actuator(s) 134).

Moreover, as shown in FIG. 7, the computing system 102 may also include a communications interface 150 to provide a means for the computing system 102 to communicate with any of the various other system components described herein. For instance, one or more communicative links or interfaces (e.g., one or more data buses) may be provided between the communications interface 150 and the meter drive member(s) 130, the vacuum source(s) 52, the gauge wheel actuator(s) 134, and the user interface(s) 118 to allow the computing system 102 to transmit control signals for controlling the operation of such components. Similarly, one or more communicative links or interfaces (e.g., one or more data buses) may be provided between the communications interface 150 and the various sensors 80, 82, 92, 132 to allow the associated sensor data to be transmitted to the computing system 102.

It should be appreciated that, in general, the computing system 102 may include suitable computing device(s) that is configured to function as described herein. In several embodiments, the computing system 102 may form part of an active planting system configured to perform a planting operation, such as by including a vehicle controller of a work vehicle configured to tow an associated planting implement 10 and/or an associated implement controller of the planting implement 10.

Referring now to FIG. 8, a flow diagram of one embodiment of a method 200 for determining a position of a gauge wheel of a row unit for a planting implement is illustrated in accordance with aspects of the present subject matter. In general, the method 200 will be described herein with reference to the planting implement 10, the row unit 18, the gauge sensor assembly 90, and the system 100 described above with reference to FIGS. 1-7. However, it should be appreciated by those of ordinary skill in the art that the disclosed method 200 may generally be utilized to monitor seed placement in associated with any planting implement having any suitable implement configuration, any row unit having any suitable row unit configuration, and/or any system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (202), the method 200 may include receiving data generated by a rotational sensor, the data being indicative of a rotational position of a gauge wheel arm of a row unit for a seed-planting implement. For instance, as discussed above, the computing system 102 may be configured to receive data generated by the position sensor(s) 92 supported relative to the frame 34, with each of the position sensor(s) being coupled to the gauge wheel arm 36 of a respective one of the row units 18 via a linkage assembly including a first sensor arm 94 and the second sensor arm 96, with the proximal end 94P of the first sensor arm 94 being coupled to the position sensor 92, and the proximal end 96P of the second sensor arm 96 being coupled to the distal end 94D of the first sensor arm 94, and the distal end 96D of the second sensor arm 96 being coupled to the gauge wheel arm 36. The data generated by the position sensor(s) 92 is indicative of a rotational position of the gauge wheel arm 36 relative to the frame 34.

Further, at (204), the method 200 may include determining the position of the gauge wheel based at least in part on the data generated by the rotational sensor. For example, as indicated above, the computing system 102 may be configured to use one or more relationships and/or algorithms correlating the data from the position sensor(s) 92 to the position of the gauge wheel(s) 37 to determine the position of the gauge wheel(s) 37 based on the data from the position sensor(s) 92.

Additionally, at (208), the method 200 may include performing a control action based at least in part on the position of the gauge wheel. For instance, as discussed above, the computing system 102 may be configured to perform a control action based at least in part on the position of the gauge wheel(s) 37 determined based on the data from the position sensor(s) 92. For example, the control action may include controlling the operation of the user interface(s) 118 to indicate the position of the gauge wheel(s) 37 and/or to indicate when the position of the gauge wheel(s) 37 is outside of a range. Additionally, or alternatively, the control action may include automatically controlling the operation of the gauge wheel actuator(s) 134 to adjust the position of the gauge wheel(s) 37 when the position of the gauge wheel(s) 37 is different than desired.

It is to be understood that the steps of the method 200 are performed by the computing system 102 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 102 described herein, such as the method 200, is implemented in software code or instructions which are tangibly stored on a tangible computer readable medium. The computing system 102 loads the software code or instructions via a direct interface with the computer readable medium or via a wired and/or wireless network. Upon loading and executing such software code or instructions by the computing system 102, the computing system 102 may perform any of the functionality of the computing system 102 described herein, including any steps of the method 200 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A row unit for a seed-planting implement, the row unit comprising:
a frame;
a disk opener supported relative to the frame, the disk opener configured to form a furrow within a field across which the seed-planting implement is traveling;
a row cleaner supported on the frame forward of the disk opener relative to a forward direction of travel of the row unit, the row cleaner being configured to reduce residue on the surface of the field in front of the furrow;
a gauge wheel arm supported relative to the frame, the gauge wheel arm comprising an upper portion and a lower portion, the lower portion being disposed at an angle relative to the upper portion about a rotational joint, the gauge wheel arm being rotatable relative to the frame about the rotational joint;
a gauge wheel rotatably coupled to the lower portion of the gauge wheel arm, the gauge wheel configured to roll along a surface of the field; and
a gauge sensor assembly, comprising:
a rotational sensor supported relative to the frame, the rotational sensor being supported on the frame at a location at which the row cleaner is supported on the frame;
a first sensor arm extending between a first proximal end and a first distal end, the first proximal end of the first sensor arm being coupled to the rotational sensor; and
a second sensor arm extending between a second proximal end and a second distal end, the second proximal end of the second sensor arm being coupled to the first distal end of the first sensor arm, the second distal end of the second sensor arm being coupled to the upper portion of the gauge wheel arm,
wherein the rotational sensor is configured to generate data indicative of a rotational position of the gauge wheel arm based at least in part on movement of the first sensor arm relative to the rotational sensor.

2. The row unit of claim 1, wherein the rotational sensor has a rotational input shaft rotatable relative to a sensor body, the rotational sensor being configured to generate the data based at least in part on a rotational position of the rotational input shaft relative to the sensor body, the first proximal end of the first sensor arm being rotationally fixed to the rotational input shaft.

3. The row unit of claim 1, wherein the rotational sensor is supported on the frame at a location rearward of the second distal end of the second sensor arm relative to a forward direction of travel of the row unit.

4. The row unit of claim 1, wherein the rotational sensor is supported on the frame at a location forward of the second distal end of the second sensor arm relative to a forward direction of travel of the row unit.

5. The row unit of claim 1, wherein the gauge sensor assembly further includes a tab rotationally fixed to the gauge wheel arm, the second distal end of the second sensor arm being coupled to the gauge wheel arm via the tab.

6. The row unit of claim 1, further comprising a computing system communicatively coupled to the rotational sensor, the computing system being configured to:

receive the data generated by the rotational sensor indicative of the rotational position of the gauge wheel arm; and determine at least one of a position of the gauge wheel or a penetration depth of the disk opener based at least in part on the data generated by the rotational sensor.

7. The row unit of claim 6, wherein the computing system is further configured to:

compare each of the at least one of the position of the gauge wheel or the penetration depth of the disk opener to a respective pre-set value; and perform a control action based at least in part on the comparison of the at least one of the position of the gauge wheel or the penetration depth of the disk opener to the respective pre-set value.

8. The row unit of claim 1, wherein the rotational sensor is positioned above the gauge wheel along a vertical direction.

9. The row unit of claim 1, wherein the upper portion of the gauge wheel arm is configured to rest against a depth stop, the depth stop being selectively movable relative to the frame to adjust the rotational position of the gauge wheel arm relative to the frame.

10. A seed-planting implement, comprising:

a toolbar; and a plurality of row units coupled to the toolbar, each row unit comprising:

a frame;

a disk opener supported relative to the frame, the disk opener configured to form a furrow within a field across which the seed-planting implement is traveling;

a gauge wheel arm supported relative to the frame;

a gauge wheel coupled to the gauge wheel arm, the gauge wheel configured to roll along a surface of the field;

a row cleaner supported on the frame forward of the disk opener relative to a forward direction of travel of the row unit, the row cleaner being configured to reduce residue on the surface of the field in front of the furrow; and a gauge sensor assembly, comprising:

a rotational sensor supported on the frame at a location at which the row cleaner is supported on the frame;

a first sensor arm extending between a first proximal end and a first distal end, the first proximal end of the first sensor arm being coupled to the rotational sensor; and a second sensor arm extending between a second proximal end and a second distal end, the second proximal end of the second sensor arm being coupled to the first distal end of the first sensor arm, the second distal end of the second sensor arm being coupled to the gauge wheel arm, wherein the rotational sensor is configured to generate data indicative of a rotational position of the gauge wheel arm based at least in part on movement of the first sensor arm relative to the rotational sensor.

11. A method for determining a position of a gauge wheel of a row unit for a seed-planting implement, the row unit comprising a frame, a disk opener supported relative to the frame, the disk opener configured to form a furrow within a field across which the seed-planting implement is traveling, a row cleaner supported on the frame forward of the disk opener relative to a forward direction of travel of the row unit, the row cleaner being configured to reduce residue on the surface of the field in front of the furrow, and a gauge wheel arm supported relative to the frame, the gauge wheel arm comprising an upper portion and a lower portion disposed at an angle relative to each other about a rotational joint, the gauge wheel arm being rotatable relative to the frame about the rotational joint, the gauge wheel being rotatably coupled to the lower portion of the gauge wheel arm and being configured to roll along a surface of the field, the method comprising:

receiving, with a computing system, data indicative of a rotational position of the gauge wheel arm, the data being generated by a rotational sensor supported relative to the frame and coupled to the gauge wheel arm via a linkage assembly, the rotational sensor being supported on the frame at a location at which the row cleaner is supported on the frame, the linkage assembly including a first sensor arm extending between a first proximal end and a first distal end, with the first proximal end of the first sensor arm being coupled to the rotational sensor, the linkage assembly further including a second sensor arm extending between a second proximal end and a second distal end, the second proximal end of the second sensor arm being coupled to the first distal end of the first sensor arm, the second distal end of the second sensor arm being coupled to the upper portion of the gauge wheel arm;

determining, with the computing system, the position of the gauge wheel based at least in part on the data generated by the rotational sensor; and performing, with the computing system, a control action based at least in part on the position of the gauge wheel.

12. The method of claim 11, further comprising comparing, with the computing system, the position of the gauge wheel to a pre-set value, wherein performing the control action comprises performing the control action based at least in part on the comparison of the position of the gauge wheel to the pre-set value.

13. The method of claim 12, wherein the control action comprises controlling, with the computing system, operation of a gauge wheel actuator to adjust the position of the gauge wheel when the position of the gauge wheel is different from the pre-set value.

14. The method of claim 12, wherein the control action comprises controlling, with the computing system, operation of a user interface to indicate that the position of the gauge wheel is different from the pre-set value.

15. The method of claim 12, wherein the pre-set value is received from at least one of an operator via a user interface or a prescription map.

16. The method of claim 11, wherein the control action comprises controlling, with the computing system, operation of a user interface to indicate the position of the gauge wheel or a position of the disk opener.

17. The method of claim 11, wherein receiving the data indicative of the rotational position of the gauge wheel arm comprises receiving the data generated by the rotational sensor, the rotational sensor having a rotational input shaft rotatable relative to a sensor body, the first proximal end of the first sensor arm being rotationally fixed to the rotational input shaft, the rotational sensor being configured to generate the data based at least in part on a rotational position of the rotational input shaft relative to the sensor body.

18. The method of claim 11, wherein the rotational sensor is supported on the frame at a location rearward of the second distal end of the second sensor arm relative to a forward direction of travel of the row unit.

19. The method of claim 11, wherein the rotational sensor is supported on the frame at a location forward of the second distal end of the second sensor arm relative to a forward direction of travel of the row unit.

* * * * *